United States Patent [19]

Eberspach

[11] Patent Number: 5,096,961

[45] Date of Patent: Mar. 17, 1992

[54] SELF-EXTINGUISHING POLYURETHANES

[75] Inventor: Werner Eberspach, Frankfurt am Main, Fed. Rep. of Germany

[73] Assignee: Hoechst Aktiengesellschaft, Frankfurt am Main, Fed. Rep. of Germany

[21] Appl. No.: 643,469

[22] Filed: Jan. 18, 1991

[30] Foreign Application Priority Data

Feb. 3, 1990 [DE] Fed. Rep. of Germany ........ 4003230

[51] Int. Cl.$^5$ .............................................. C08K 3/02
[52] U.S. Cl. ................... 524/707; 524/100; 524/102; 524/416; 524/590; 524/706
[58] Field of Search ............... 524/707, 706, 100, 102, 524/416, 590

[56] References Cited

U.S. PATENT DOCUMENTS

| | | | |
|---|---|---|---|
| 3,423,343 | 1/1969 | Barnett | 528/52 |
| 4,198,493 | 4/1980 | Marciandi | 524/416 |
| 4,467,056 | 8/1984 | Staendeke et al. | 523/179 |
| 4,639,331 | 1/1987 | Elsner et al. | 523/200 |
| 4,670,483 | 6/1987 | Hall et al. | 523/179 |
| 4,772,642 | 9/1988 | Staendeke | 523/205 |
| 4,818,775 | 4/1989 | Teumac et al. | 521/107 |
| 4,853,424 | 8/1989 | Staendeke et al. | 523/205 |

FOREIGN PATENT DOCUMENTS 3720094 3/1988 Fed. Rep. of Germany .
2094315 9/1982 United Kingdom .

Primary Examiner—Morton Foelak

[57] ABSTRACT

Self-extinguishing polyurethanes are obtained by stepwise polyaddition of diisocyanates or polyisocyanates with polyols with the addition of a flameproofing agent comprising a phosphorus component and a nitrogen component as synergists. While the phosphorus component used is an ammonium polyphosphate which is sparingly soluble in water and, if desired, has been microencapsulated with a melamine/formaldehyde resin, the organic nitrogen component is selected from the group consisting
  a) bis(triazinyl)piperazines
  b) hydroxyalkyl isocyanurates
  c) condensation products of amino-1,3,5-triazines with aldehydes.

8 Claims, No Drawings

SELF-EXTINGUISHING POLYURETHANES

The present invention relates to self-extinguishing polyurethanes which are obtained by stepwise polyaddition of diisocyanates or polyisocyanates with polyols with the addition of a flameproofing agent comprising a phosphorus component and a nitrogen component as synergists.

It is known to use water-insoluble ammonium polyphosphates of the general formula $$H_{(n-m)+2}(NH_4)_m P_n O_{3n+1}$$

in which n is an integer between 10 and 800 and the ratio m/n is about 1 for the flameproof finish of polyurethanes. The individual ammonium polyphosphate particles used can be encapsulated in a water-insoluble polycondensation product of melamine with formaldehyde (cf. U.S. Pat. Nos. 3,423,343 and 4,467,056).

The intumescent flame protection system for the flame resistant finish of polymeric materials, in particular polypropylene, of German Offenlegungsschrift 3,720,094 substantially comprises a mixture of ammonium polyphosphate and tris(2-hydroxyethyl) isocyanurate. If a cured melamine/formaldehyde resin is used instead of tris(2-hydroxyethyl) isocyanurate, the result of the flame test of the polypropylene thus finished is unsatisfactory.

Finally, it is known from British Laid-Open Application 2,094,315 to provide polyurethane rigid foam with a flameproof finish by means of a flameproofing agent substantially comprising ammonium polyphosphate, melamine and starch.

Surprisingly, it has now been found that the flameproof finish of polyurethanes, in particular of polyurethane foams, can be markedly improved by using a combination of ammonium polyphosphate and only one carbon-containing nitrogen compound acting as a synergist as flameproofing agent.

In detail, the present invention accordingly relates to self-extinguishing polyurethanes obtained by stepwise polyaddition of diisocyanates or polyisocyanates with polyols with the addition of a flameproofing agent, in which the flameproofing agent comprises an ammonium polyphosphate which is sparingly soluble in water and a nitrogen component from the group comprising bis(triazinyl)piperazines, hydroxyalkyl isocyanurate and condensation products of amino-1,3,5-triazines with aldehydes, which acts as a synergist.

Alternatively, the self-extinguishing polyurethanes according to the invention can furthermore also have the feature that a) the ammonium polyphosphate of the formula $(NH_4PO_3)_n$ has a chain length n of about 700, a phosphorus content of 25 31.5±0.5% by weight, a nitrogen content of 14.5± 0.5% by weight and less than 10% of water-soluble components—measured in a 10% strength aqueous suspension at 25° C.;

b) the ammonium polyphosphate of the formula $(NH_4PO_3)_n$ has a chain length n of about 700 and has been microencapsulated with a melamine/formaldehyde resin and has a phosphorus content of 29.0±1%, a nitrogen content of 16.5±1% and less than 0.3% of watersoluble components—measured in a 10% strength aqueous suspension at 25° C.;

c) N,N'-bis(1,3,5-triazin-6-yl)piperazines are used as bis(triazinyl)piperazines;

d) 6 to 10 parts of bis(triazinyl)piperazines and a total of 18 to 35 parts of ammonium polyphosphate and bis(triazinyl)piperazines are used per 100 parts of polyol and that the mixing ratio of ammonium polyphosphate to bis(triazinyl)piperazine in parts by weight is (1.3 to 2.5) : 1;

e) tris(2-hydroxyethyl) isocyanurate serves as the hydroxyalkyl isocyanurate;

f) 3 to 15 parts of hydroxyalkyl isocyanurates and a total of 12 to 24 parts of ammonium polyphosphate and hydroxyalkyl isocyanurates are used per 100 parts of polyol and that the mixing ratio of ammonium polyphosphate to hydroxyalkyl isocyanurate in parts by weight is (0.5 to 3.5) : 1;

g) melamine/formaldehyde resins serve as condensation products of amino-1,3,5-triazines with aldehydes;

h) 3 to 13 parts of condensation products of amino-1,3,5-triazines with aldehydes and a total of 12 to 35 parts of ammonium polyphosphate and condensation products of amino-1,3,5-triazines with aldehydes are used per 100 parts of polyol and that the mixing ratio of ammonium polyphosphate to the condensation products in parts by weight is (0.2 to 4) : 1.

The bis(triazinyl)piperazines which are used for the preparation of the self-extinguishing polyurethanes according to the invention and have the general formula

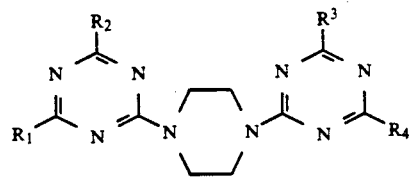

in which $R_1$, $R_2$, $R_3$ and $R_4$ can be identical or different and can be, independently of one another, a chlorine, hydroxyl, alkoxy, aryloxy, alkylamino, dialkylamino, morpholino, arylamino or diarylamino substituent, can be obtained by reacting in a first reaction step cyanuric halide, piperazine and a monohydric inorganic base in a molar ratio of 1 : (0.5 to 0.6) : (1 to 1.2) in the presence of water and a further suspending agent at temperatures of minus 20° C. to 0° C. and at a pH of 5 to 7, and the N,N'-bis(2,4-dichloro-1,3,5-triazin-6-yl)piperazine obtained as intermediate is filtered off and washed with water. In the cases where $R_1$, $R_2$, $R_3$ and $R_4$ are not chlorine, the intermediate mentioned is mixed in a second reaction step with a monohydric inorganic base and a compound XH or YH, where X and Y can be identical or different and can be, for example, methoxy, ethoxy or morpholino, in a molar ratio of (2 to 2.2) : (2 to 2.2) per mole of cyanuric halide used in the first reaction step in the presence of a suspending agent, heated to reflux for 12 to 20 hours, cooled, neutralized, and the target product is filtered off.

In the hydroxyalkyl isocyanurates of the general formula

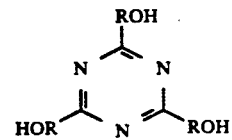

which are used for the preparation of the self-extinguishing polyurethanes according to the invention, R is an alkylene group of 1-6 carbon atoms.

Condensation products of di- or triamino-1,3,5-triazine with aldehydes can serve as organic nitrogen components for the preparation of the self-extinguishing polyurethanes according to the invention.

The carbon-containing nitrogen compounds used for the self-extinguishing polyurethanes according to the invention in combination with ammonium polyphosphate lead to a significant improvement in the flame resistance of polyurethanes.

The invention is illustrated in more detail by way of the examples which follow.

EXAMPLE 1

(comparative example)

A polyester/polyurethane flexible foam was prepared by the following recipe:
- 500 g of ®Desmophen 2200 (Bayer AG, Leverkusen) this is a polyol based on adipic acid, diethylene glycol and a triol having an OH number of 60 ±3 mg of KOH/g
- 17.5 g of water
- 7.5 g of ®Desmorapid DB (Bayer AG Leverkusen) this is an amine catalyst
- 5.0 g of ®Polyurax SE 232 (BP Chemical Ltd.) this is an organosilicone foam stabilizer
- 100 g of ®Exolit 422 (Hoechst AG, Frankfurt/Main)
  this is a fine-grained ammonium polyphosphate which is sparingly soluble in water and has the formula $(NH_4PO_3)_n$ where $n \sim 700$
- 227.5 g of ®Desmodur T80 (Bayer AG, Leverkusen)
  this is a mixture composed of 80% by weight of 2,4-toluylene diisocyanate and 20% by weight of 2,6-toluylene diisocyanate The polyurethane foam thus obtained had a bulk density of 38 kg/m$^3$, and the rise time was 130 s.

To determined the flame resistance of the foam, the limiting oxygen index (LOI) was determined according to ASTMD-2863-74 and a fire test by edge inflammation was carried out according to DIN 4102, Part 1, Section 6.2 (May 1981). The results of the fire tests are listed in Table 1.

EXAMPLE 2 (comparative example)

Example 1 was repeated, except that 125 g of ®Exolit 422 were used. The results of the fire tests are listed in Table 1.

EXAMPLE 3 (comparative example)

Example 1 was repeated, except taht ®Exolit 462 was used instead of ®Exolit 422.

®Exolit 462 is prepared by microencapsulation of ®Exolit 422 with a melamine/formaldehyde resin by the process according to European Patent 180,795 and contains about 10% by weight of capsule material.

The results of the fire tests are listed in Table 1.

EXAMPLE 4

(comparative example)

Example 1 was repeated, except that 125 g of ®Exolit 462 were used instead of 100 g of ®Exolit 422. The results of the fire tests are listed in Table 1.

EXAMPLE 5

(comparative example)

Example 1 was repeated, except that only 75 g of ®Exolit 422 were used as flameproofing agent but in addition 25 g of melamine were used. The results of the fire tests are listed in Table 1.

EXAMPLE 6

(comparative example)

Example 1 was repeated, except that, apart from 100 g of ®Exolit 422, another 25 g of melamine were used as flame-proofing agent. The results of the fire tests are listed in Table 1.

EXAMPLE 7

(according to the invention)

Example 1 was repeated, except that 75 g of ®Exolit 422 and 25 g of tris(2-hydroxyethyl) isocyanurate (THEIC) were used as flameproofing agent. The results of the fire tests are listed in Table 2.

EXAMPLE 8

(comparative example)

Example 1 was repeated, except that, apart from 100 g of ®Exolit 422, another 25 g of tris(2-hydroxyethyl) isocyanurate were used as flameproofing agent. The results of the fire tests are listed in Table 2.

EXAMPLE 9

(according to the invention)

Example 1 was repeated, except that only 50 g of ®Exolit 422 but in addition 50 g of tris(2-hydroxyethyl) isocyanurate were used as flameproofing agent. The results of the fire tests are listed in Table 2.

EXAMPLE 10

(comparative example)

Example 1 was repeated, except that 25 g of ®Exolit 462 and 25 g of tris(2-hydroxyethyl) isocyanurate were used instead of 100 g of ®Exolit 422. The results of the fire tests are listed in Table 2.

EXAMPLE 11

(according to the invention)

Example 1 was repeated, except that only 75 g of ®Exolit 422 but in addition 25 g of ®Madurit MW 909 (Hoechst AG, Frankfurt) were used as flameproofing agent.

®Madurit MW 909 is a non-plasticized melamine/formaldehyde resin whose 50% strength aqueous solution has a dynamic viscosity of about 80 mPa.s, a pH of 9 to 10 and a density (at 20° C.) of 1.210 to 1.225 g/ml.

The results of the fire tests are listed in Table 2.

EXAMPLE 12

(according to the invention)

Example 1 was repeated, except that only 60 g of ®Exolit 422 but in addition 20 g of ®Madurit MW 909 were used as flameproofing agent. The results of the fire tests are listed in Table 3.

EXAMPLE 13

(according to the invention)

Example 1 was repeated, except that only 50 g of ®Exolit 422 but in addition 50 g of ®Madurit MW 909 were used as flameproofing agent. The results of the fire tests are listed in Table 3.

EXAMPLE 14

(according to the invention)

Example 1 was repeated, except that 75 g of ®Exolit 462 and 25 g of ®Madurit MW 909 were used as flameproofing agent instead of 100 g of ®Exolit 422. The results of the fire tests are listed in Table 3.

EXAMPLE 15

(comparative example)

Example 1 was repeated, except that only 75 g of ®Exolit 422 but in addition 25 g of 1,4-bis[2,4-dimethoxy-1,3,5-triazin-6-yl]piperazine were used as flameproofing agent.

1,4-bis[2,4-Dimethoxy-1,3,5-triazin-6-yl]piperazine was prepared from cyanuric chloride, piperazine and methanol by the process according to German Patent Application of file number P 39 27 623.6.

The results of the fire tests are listed in Table 3.

EXAMPLE 16

(comparative example)

Example 1 was repeated, except that 75 g of ®Exolit 462 and 25 g of 1,4-bis[2,4-dimorpholino-1,3,5-triazin-6-yl]piperazine were used as flameproofing agent. The results of the fire tests are listed in Table 4.

EXAMPLE 17

(according to the invention)

Example 1 was repeated, except that 60 g of ®Exolit 462 and 40 g of 1,4-bis[2,4-dimethoxy-1,3,5-triazin-6-yl]piperazine were used as flameproofing agent. The results of the fire test are listed in Table 4.

EXAMPLE 18

(according to the invention)

Example 1 was repeated, except that 60 g of ®Exolit 462 and 40 g of 1,4-bis[2,4-diethoxy-1,3,5-triazin-6-yl]piperazine were used as flameproofing agent. The results of the fire test are listed in Table 4.

EXAMPLE 19

(according to the invention)

Example 1 was repeated, except that 60 g of ®Exolit 462 and 40 g of 1,4-bis[2,4-dimorpholino-1,3,5-triazin-6-yl]piperazine were used as flameproofing agent. The results of the fire test are listed in Table 4.

TABLE 1

Testing of flexible polyurethane foams

| Example | Flameproofing system Type | Amount ... parts/ 100 parts of polyol | Bulk density (kg/m$^3$) | Limiting oxygen index[1] | DIN 4012[2] average flame height (mm) | Class |
|---|---|---|---|---|---|---|
| 1 (Comparison) | ® Exolit 422 | 20 | 38 | 0.24 | 175 | n.c.[3] |
| 2 (Comparison) | ® Exolit 422 | 25 | 40 | 0.25 | 170 | n.c. |
| 3 (Comparison) | ® Exolit 462 | 20 | 37 | 0.24 | 185 | n.c. |
| 4 (Comparison) | ® Exolit 462 | 25 | 38 | 0.25 | 165 | n.c. |
| 5 (Comparison) | ® Exolit 422 melamine | 15 5 | 38 | 0.23 | 190 | n.c. |
| 6 (Comparison) | ® Exolit 422 melamine | 20 5 | 39 | 0.24 | 180 | n.c. |

[1]Limiting oxygen index according to ASTM-D 2863-74
[2]Fire test according to DIN 4102, Part 1 (edge inflammation)
[3]n.c. = not classified

TABLE 2

Testing of flexible polyurethane foams

| Example | Flameproofing system Type | Amount ... parts/ 100 parts of polyol | Bulk density (kg/m$^3$) | Limiting oxygen index[1] | DIN 4012[2] average flame height (mm) | Class |
|---|---|---|---|---|---|---|
| 7 (according to the invention) | ® Exolit 422 THEIC[4] | 15 5 | 38 | 0.24 | 132 | B2 |
| 8 (Comparison) | ® Exolit 422 THEIC | 20 5 | 40 | 0.24 | 155 | n.c.[3] |
| 9 (according to the invention) | ® Exolit 422 THEIC | 10 10 | 36 | 0.23 | 140 | B2 |
| 10 (Comparison) | ® Exolit 462 THEIC | 5 5 | 34 | 0.23 | 160 | n.c. |
| 11 (according to the | ® Exolit 422 ® Madurit MW 909 | 15 5 | 39 | 0.24 | 132 | B2 |

TABLE 2-continued

Testing of flexible polyurethane foams

| Example | Flameproofing system Type | Amount ... parts/ 100 parts of polyol | Bulk density (kg/m³) | Limiting oxygen index[1] | DIN 4012[2] average flame height (mm) | Class |
|---|---|---|---|---|---|---|
| invention) | | | | | | |

[1] Limiting oxygen index according to ASTM-D 2863-74
[2] Fire test according to DIN 4102, Part 1 (edge inflammation)
[3] n.c. = not classified
[4] THEIC = tris(2-hydroxyethyl) isocyanurate

TABLE 3

Testing of flexible polyurethane foams

| Example | Flameproofing system Type | Amount ... parts/ 100 parts of polyol | Bulk density (kg/m³) | Limiting oxygen index[1] | DIN 4012[2] average flame height (mm) | Class |
|---|---|---|---|---|---|---|
| 12 (according to the invention) | ® Exolit 422<br>® Madurit MW 909 | 12<br>4 | 35 | 0.24 | 145 | B2 |
| 13 (according to the invention) | ® Exolit 422<br>® Madurit MW 909 | 10<br>10 | 39 | 0.24 | 136 | B2 |
| 14 (according to the invention) | ® Exolit 462<br>® Madurit MW 909 | 15<br>5 | 36 | 0.24 | 140 | B2 |
| 15 (Comparison) | ® Exolit 422<br>1,4-bis[2,4-dimethoxy-1,3,5-triazin-6-yl]-piperazine | 15<br>5 | 38.5 | 0.24 | 170 | n.c.[3] |

[1] Limiting oxygen index according to ASTM-D 2863-74
[2] Fire test according to DIN 4102, Part 1 (edge inflammation)
[3] n.c. = not classified

TABLE 3

Testing of flexible polyurethane foams

| Example | Flameproofing system Type | Amount ... parts/ 100 parts of polyol | Bulk density (kg/m³) | Limiting oxygen index[1] | DIN 4012[2] average flame height (mm) | Class |
|---|---|---|---|---|---|---|
| 16 (Comparison) | ® Exolit 462<br>1,4-bis[2,4-dimorpholino-1,3,5-triazin-6-yl]piperazine | 15<br>5 | 38 | 0.23 | 160 | n.c.[3] |
| 17 (according to the invention) | ® Exolit 462<br>1,4-bis[2,4-diemthoxy-1,3,5-triazin-6-yl]-piperazine | 12<br>8 | 39 | 0.24 | 145 | B2 |
| 18 (according to the invention) | ® Exolit 462<br>1,4-bis[2,4-diethoxy-1,3,5-triazin-6-yl]-piperazine | 12<br>8 | 39 | 0.24 | 140 | B2 |
| 19 (according to the invention) | ® Exolit 462<br>1,4-bis[2,4-dimorpholino-1,3,5-triazin-6-yl]-piperazine | 12<br>8 | 38 | 0.24 | 140 | B2 |

[1] Limiting oxygen index according to ASTM-D 2863-74
[2] Fire test according to DIN 4102, Part 1 (edge inflammation)
[3] n.c. = not classified

We claim:

1. A self-extinguishing polyurethane obtained by stepwise polyaddition of diisocyanates or polyisocyanates with polyols and the addition of a flameproofing agent comprising an ammonium polyphosphate which is sparingly soluble in water and an organic nitrogen component as synergists, the organic nitrogen component being at least one bis(triazinyl)piperazine, wherein 6 to 10 parts of bis(triazinyl)piperazines and a total of 18 to 35 parts of ammonium polyphosphate and bis(triazinyl)piperazines are used per 100 parts of polyol and wherein the mixing ratio of ammonium polyphosphate to bis(triazinyl)piperazine in parts by weight is (1.3 to 2.5) : 1.

2. A self-extinguishing polyurethane as claimed in claim 1, wherein the ammonium polyphosphate of the formula $(NH_4PO_3)_n$ has a chain length n of about 700, a phosphorus content of 31.5±0.5% by weight, a nitrogen content of 14.5±0.5% by weight and less than 10% of water-soluble components—measured in a 10% strength aqueous suspension at 25° C.

3. A self-extinguishing polyurethane as claimed in claim 1, wherein the ammonium polyphosphate of the formula $(NH_4PO_3)_n$ has a chain length n of about 700 and has been microencapsulated with a melamine/formaldehyde resin and has a phosphorus content of 29.0±1%, a nitrogen content of 16.5±1% and less than 0.3% of water-soluble components—measured in a 10% strength aqueous suspension at 25° C.

4. A self-extinguishing polyurethane as claimed in claim 1, wherein N,N'-bis(1,3,5-triazin-6-yl)piperazines are used as bis(triazinyl)piperazines.

5. A self-extinguishing polyurethane obtained by stepwise polyaddition of diisocyanates or polyisocyanates with polyols and the addition of a flameproofing agent comprising an ammonium polyphosphate which is sparingly soluble in water and an organic nitrogen component as synergist the organic nitrogen component being at least one hydroxyalkyl isocyanurate, wherein 3 to 15 parts of hydroxyalkyl isocyanurate and a total of 12 to 24 parts of ammonium polyphosphate and hydroxyalkyl isocyanurate are used per 100 parts of polyol and wherein the mixing ratio of ammonium polyphosphate to hydroxyalkyl isocyanurate in parts by weight is (0.5 to 3.5) :1.

6. A self-extinguishing polyurethane as claimed in claim 5, wherein tris(2-hydroxyethyl) isocyanurate serves as the hydroxyalkyl isocyanurate.

7. A self-extinguishing polyurethane as claimed in claim 5, wherein the ammonium polyphosphate of the formula $(NH_4PO_3)_n$ has a chain length n of about 700, a phosphorus content of 31.5±0.5% by weight, a nitrogen content of 14.5±0.5% by weight and less than 10% of water-soluble components—measured in a 10% strength aqueous suspension at 25° C.

8. A self-extinguishing polyurethane as claimed in claim 5, wherein the ammonium polyphosphate of the formula $(NH_4PO_3)_n$ has a chain length n of about 700 and has been microencapsulated with a melamine/formaldehyde resin and ha a phosphorus content of 29.0±1%, a nitrogen content of 16.5±1% and less than 0.3% of water-soluble components—measured in a 10% strength aqueous suspension at 25° C.

* * * * *